United States Patent [19]

Kasahara et al.

[11] Patent Number: 5,003,021

[45] Date of Patent: Mar. 26, 1991

[54] PROCESS FOR PRODUCING AN AROMATIC VINYL COMPOUND-VINYL CYANIDE COMPOUND COPOLYMER

[75] Inventors: Hideo Kasahara, Yokosuka; Toshiharu Kawasaki, Kawasaki; Noriaki Umeda, Kurashiki, all of Japan

[73] Assignee: Asahi Kasei Kogyo Kabushiki Kaisha, Osaka, Japan

[21] Appl. No.: 322,331

[22] Filed: Mar. 10, 1989

[30] Foreign Application Priority Data

Mar. 22, 1988 [JP] Japan ................................. 63-65890
Mar. 22, 1988 [JP] Japan ................................. 63-65891

[51] Int. Cl.$^5$ .......................................... C08F 220/44
[52] U.S. Cl. ..................................... 526/342; 526/212
[58] Field of Search .............................. 526/342, 212

[56] References Cited

U.S. PATENT DOCUMENTS 2,895,938  7/1959  Ohlinger et al. .
3,814,739  6/1974  Takeda ................................. 526/342
4,052,355  10/1977  Neukam et al. ....................... 526/342

FOREIGN PATENT DOCUMENTS 0334437  9/1989  European Pat. Off. .

57-25310  2/1982  Japan .
60-260605  12/1985  Japan .

OTHER PUBLICATIONS

Indian J. Chem., vol. 6, Feb. (1968), pp. 116–118.

*Primary Examiner*—Joseph L. Schofer
*Assistant Examiner*—N. Sarofin
*Attorney, Agent, or Firm*—Armstrong, Nikaido, Marmelstein, Kuvobcik & Murray

[57] ABSTRACT

A process for producing a copolymer by continuously copolymerizing in a solution monomers comprising 40 to 95% by weight of an aromatic vinyl compound and 5 to 60% by weight of a vinyl cyanide compound, and further 0 to 30% by weight of a vinyl compound copolymerizable with the aromatic vinyl compound and vinyl cyanide compound, wherein 10 to 100 parts by weight of a solvent containing not less than 40% by weight of an alcohol is used as the polymerization solvent based on 100 parts by weight of the total amount of the monomers. According to the process, attachment of a gel-like polymer onto the polymerization vessel or device can be prevented. The copolymer is useful as a thermoplastic resin for various molded articles including electrical parts for domestic uses, automobile parts and commodity goods.

17 Claims, No Drawings

PROCESS FOR PRODUCING AN AROMATIC VINYL COMPOUND-VINYL CYANIDE COMPOUND COPOLYMER

DESCRIPTION

1. Technical Field

The present invention relates to an improved process for continuously producing an aromatic vinyl compound-vinyl cyanide compound copolymer. More specifically, the present invention relates to a process which enables continuous running over a long period by preventing formation of gel-like polymers during production of an aromatic vinyl compound-vinyl cyanide compound copolymer, thereby reducing attachment of gel-like polymers onto an inner wall of the polymerization device.

2. Background Art

Copolymers composed mainly of styrene and acrylonitrile have been used as so-called AS resins in a wide scope of fields because of their various excellent properties such as transparency, chemical resistance, rigidity, moldability, etc.

As the process for producing these copolymers, there have been hitherto used emulsion polymerization, suspension polymerization, etc. and, in recent years, continuous polymerization according to mass polymerization or solution polymerization to provide energy savings, prevent pollution, etc. In the case of solution polymerization, an aromatic hydrocarbon solvent such as ethylbenzene, toluene, etc. has been employed. However, in continuous production of an aromatic vinyl compoundvinyl cyanide compound copolymer, when continuous running time of the polymerization device becomes long, gel-like polymers are formed and attach to the polymerization reactor, pipeline, etc., whereby stable running becomes impossible. Also, a portion of the gel-like polymers are entrained in the product to worsen the appearance of the transparent molded article, remarkably lowering its commercial value.

In contrast, when polymerization is carried out batchwise at a relatively low temperature by forming polymer particles in water or another solvent as in the case of suspension polymerization, although there is no such drawback as described above, there are other drawbacks such as productivity being inferior, and polymer hue being worsened.

Accordingly, it is of industrially great significance to solve the problem of formation of gel-like polymers in the continuous polymerization process.

In the prior art, enormous time and labor were required to separate and remove the gel-like polymers by filtration of the polymer solution with a filter, or by washing out the gel-like polymers after a shortened continuous running time, whereby the productivity cannot help being lowered.

As methods for improving these drawbacks, there are, for instance, a method in which continuous mass polymerization is carried out by controlling the water content in the starting materials to a range of 200 to 520 ppm (Japanese Patent Publication Unexamined No. 25310/1982), a method in which mass or solution polymerization is continuously carried out with addition of 0.1 to 3.0 parts by weight of a higher fatty acid amide into the monomer mixture (Japanese Patent Publication Unexamined No. 260605/1985). However, in these methods, removal of the water in the monomers is required, or the higher fatty acid amide damages transparency of the copolymer resin. Thus, these methods do not lead to simplification of the polymerization operation or improvement of quality of the products.

Also, polymerization of styrene and acrylonitrile in tertiary butanol is disclosed in INDIAN J. CHEM., VOL. 6, February (1968), pp. 116–118. However, this is a small scale experimental study for determining the copolymerization reaction ratio, using a batchwise polymerization device at a low temperature (60° C.) and at a low conversion (3–8%), and is entirely different from the continuous polymerization process on an industrial scale of the present invention.

The present inventors have intensively studied a process for producing an aromatic vinyl compound-vinyl cyanide compound copolymer by continuous polymerization in a solution with the object of preventing formation of a gel-like polymer and accordingly obtaining effective and stable production of the copolymer for a long term.

As a result, the present inventors have found that they can attain the object as described above by employing as the polymerization solvent in a continuous solution polymerization process for preparing copolymers of an aromatic vinyl compound and a vinyl cyanide compound a solvent containing not less than 40% by weight of an alcohol, and accomplished the present invention.

DISCLOSURE

More specifically, the present invention provides a process for producing a copolymer by continuously copolymerizing in a solution monomers comprising 40 to 95% by weight of an aromatic vinyl compound and 5 to 60% by weight of a vinyl cyanide compound, and further 0 to 30% by weight of a vinyl compound copolymerizable with the aromatic vinyl compound and vinyl cyanide compound, wherein 10 to 100 parts by weight of a solvent containing not less than 40% by weight of an alcohol is used as the polymerization solvent based on 100 parts by weight of the total amount of the monomers.

As the aromatic vinyl compound used in the present invention, styrene is generally employed, but if desired, an alkyl-substituted styrene such as -methylstyrene, p-methylstyrene, or the like can also be used.

As the vinyl cyanide compound, acrylonitrile, methacrylonitrile, or the like can be employed either singly or as a mixture.

Further, as the other vinyl compounds copolymerizable with the aromatic vinyl compound and vinyl cyanide compound, acrylates such as methyl methacrylate, butyl acrylate and the like; maleimide compounds such as N-methylmaleimide, N-phenylmaleimide, N-cyclohexylmaleimide; etc. can be used.

The content of the aromatic vinyl compound in the total monomer mixture can be 40 to 95% by weight, preferably 50 to 85% by weight. When the content is lower than 40% by weight, heat decoloration resistance is inferior, while when the content is higher than 95% by weight, mechanical characteristics, chemical resistance, etc. are inferior.

The content of the vinyl cyanide compound in the total monomer mixture can be 5 to 60% by weight, preferably 15 to 50% by weight. When the content of the vinyl cyanide compound is less than 5% by weight, physical properties of the polymers obtained are unfavorably inferior. On the other hand, when the content is higher than 60% by weight of the vinyl cyanide compound, the hue of the copolymer obtained is poor, and therefore the copolymer can not be used so often in the field where transparency is required.

The content of the other vinyl compounds copolymerizable with the aromatic vinyl compound and vinyl cyanide compound as described above in the total monomer mixture is preferably not higher than 30% by weight. Mechanical characteristics, chemical resistance, etc. of the copolymer will be inferior when the content exceeds that level.

The solvent used in the present invention is required to be a solvent containing not less than 40% by weight of alcohols. It should preferably contain not less than 70% by weight of alcohols, more preferably not less than 90% by weight of alcohols, and most preferably should consist of alcohols alone. As the alcohols, those which can provide a homogeneous polymer solution substantially without polymer precipitation under the conditions used in carrying out the polymerization, including methyl alcohol, ethyl alcohol, propyl alcohol, butyl alcohol, amyl alcohol, hexyl alcohol, and the like can be used. Among them, aliphatic alcohols having 3 to 6 carbon atoms are preferred Alcohols having high reactivity with radicals formed from the vinyl cyanide compound are more preferred. For example, in the polymerization of acrylonitrile, secondary butyl alcohol having a large chain transfer constant is most preferred.

The polymer solution in a homogeneous state as described above is a transparent solution without precipitation of the polymer in the solution. As the factors affecting the homogeneous state, the kind of polymerization solvent, the polymer content in the polymer solution, the polymerization temperature, etc. may be enumerated.

As the solvent used in a mixture with the alcohols, any solvent which causes no trouble in the polymerization reaction can be used. Specific examples include aromatic hydrocarbons such as benzene, toluene, xylene, ethylbenzene, cumene, mesitylene, etc.; ketones such as acetone, methyl ethyl ketone, methyl propyl ketone, diethyl ketone, methyl butyl ketone, ethyl butyl ketone, dipropyl ketone, methyl amyl ketone, cyclohexanone, methylcyclohexanone, etc; nitriles such as acetonitrile, etc.; glycol monoethers such as ethylene glycol monomethyl ether, ethylene glycol monoethyl ether, etc.; tetrahydrofuran, ethylene carbonate γ-butyrolactone, dimethylformamide; and aliphatic hydrocarbons such as hexane, cyclohexane, etc.

By using the alcohols as described above as the solvent, gel-like polymer attachment onto the inner wall of the polymerization device can be inhibited. Generally speaking, it is considered that polymer attachment onto the polymerization device is increased when a solvent not having good solubility for the polymer such as an alcohol is used, but surprisingly, preferable results can be exhibited when a homogeneous solution is provided under the polymerization conditions as can be seen in case of the present invention.

The amount of the solvent used is generally 10 to 100 parts by weight, preferably 20 to 70 parts by weight, based on 100 parts by weight of the total amount of the monomers. When the amount of the solvent used is less than 10 parts by weight, gel-like polymer attachment cannot be inhibited, while when the amount is more than 100 parts by weight, productivity will be undesirably lowered.

The polymerization reactor for carrying out the continuous polymerization in the present invention may include a polymerization reactor such as a well-mixed stirred tank type, a tubular type, an extruder type, a lateral type having a biaxial stirring blade, etc.

The polymerization conversion in the polymerization reactor should be high from the standpoint of productivity, and preferably not lower than 30%, more preferably not lower than 40%. It is important even in such case to select the polymerization conditions, the kind of solvent and the amount of solvent so that the polymerization solution will be in a homogeneous state. The polymerization temperature should be not lower than 90° C. and lower than 200° C., preferably not lower than 100° C. and lower than 180° C. When the polymerization temperature is too low, the extent of the gel-like polymer attachment onto the polymerization device will be undesirably increased. On the other hand, when the polymerization temperature is too high, the molecular weight of polymers obtained will be undesirably too small.

As the methods for recovering the copolymer by removing a solvent and unreacted monomers from the copolymer solution, general methods can be employed such as a method in which the copolymer solution is preheated and subjected to devolatizing at a reduced pressure, a method in which devolatization is effected directly through an extruder equipped with a vent, or a method in which the solution is suspended in water and subjected to steam stripping.

In the present invention, preferable results can also be obtained by addition of a chain transfer agent to the polymerization solvent, whereby attachment of the gel-like polymer onto the polymerization device can be further reduced. As the chain transfer agent, mercaptans, α-methylstyrene dimer, hindered phenols, amines, etc. can be used.

In the present invention, a polymerization initiator may also be used, if desired The present invention exhibits its effect when practiced according to a continuous polymerization method, and the effect can be exhibited especially when the present invention is used in producing a copolymer during a continuous running time of at least 200 hours, and even of 700 hours or longer in the case of a long running time. The continuous running method as described above means a method in which a mixture of monomers and solvent is continuously fed into a polymerization reactor and the polymer solution containing the copolymer is continuously taken out from the polymerization reactor When the continuous running time is short, attachment of the gel-like polymer onto the polymerization device is too little to pose a problem, but attachment of the gel-like polymer onto the polymerization device is a problem when the continuous running time becomes long.

According to the present invention, attachment of the gel-like polymer onto the polymerization device can be prevented, and therefore the time for continuous running can be extended, whereby an aromatic vinyl compound-vinyl cyanide compound copolymer can be produced efficiently while using the advantage of a continuous polymerization. The effect of the present invention is greatly exhibited when carrying out a long term continuous polymerization for a running time exceeding 200 hours. Also, by using alcohols as the solvent, the hue of the polymer becomes better, as compared with the use of a solvent generally employed such as ethylbenzene.

The copolymer obtained by the present invention can be used as a thermoplastic resin for various molded articles such as electrical parts for domestic uses, automobile parts, commodity goods, etc.

EXAMPLES

The present invention is described in more detail below in the Examples, and however the present invention is not limited by these Examples.

In the Examples, "parts" and "%" represent parts by weight and % by weight, respectively.

Examples 1 through 13 and Comparative Examples 1 throuqh 4

Into a well-mixed stirred tank type polymerization reactor of 80-liters inner volume was fed a mixture comprising styrene, acrylonitrile and a solvent shown in Table 1. Polymerization is carried out at 140 to 160° C. to a polymerization conversion of 55 to 60% for an average residence time of 2.5 hours. The same amount of the polymer solution fed to the reactor is taken out, and unreacted monomers and the solvent is recovered in a devolatization device under vacuum to obtain a copolymer resin shaped in pellets.

Continuous running for 700 hours is performed, and the state of the gel-like polymer attached to the inner wall of the polymerization reactor is observed. Further, the pellets of the copolymer resin obtained are molded by injection, and the appearance of the molded article is observed. The results are shown in Table 1.

The polymer solution in the polymerization reactor in these Examples is a transparent and homogeneous solution under the polymerization conditions, but when cooled to room temperature, it becomes turbid and precipitation of the polymer is observed

Examples 14 and 15

Into a completely mixing type polymerization reactor of 80-liters inner volume was fed a mixture comprising styrene, acrylonitrile, N-phenylmaleimide, a solvent shown in Table 2 and 700 ppm of 1,1-bis(t-butylperoxy)-cyclohexane. Polymerization is carried out at 110° to 120° C. to a polymerization conversion of 50 to 55% in a similar manner to that described in Examples 1 through 13 to obtain a copolymer resin shaped in pellets. Continuous running for 700 hours is performed, and the same observations as made in Examples 1 through 13 are conducted. The results are shown in Table 2.

TABLE 1

| | Composition of solution of starting material (wt. parts) | | | Amount of gel-like polymer attached to a wall of reactor (1) | Appearance of molded article (2) | State of running | Hue of polymer |
|---|---|---|---|---|---|---|---|
| | Acrylonitrile | Styrene | Solvent | | | | |
| Example | | | | | | | |
| 1 | 30 | 70 | sec-Butyl alcohol 35 | 30 | good | substantially no change | colorless |
| 2 | 30 | 70 | sec-Butyl alcohol 50 | 27 | good | substantially no change | colorless |
| 3 | 30 | 70 | sec-Butyl alcohol 80 | 22 | good | substantially no change | colorless |
| 4 | 30 | 70 | t-Butyl alcohol 35 | 250 | good | substantially no change | colorless |
| 5 | 30 | 70 | n-Butyl alcohol 35 | 150 | good | substantially no change | colorless |
| 6 | 30 | 70 | Isopropyl alcohol 35 | 220 | good | substantially no change | colorless |
| 7 | 30 | 70 | n-Butyl alcohol/Ethylbenzene 28/7 | 170 | good | substantially no change | colorless |
| 8 | 30 | 70 | sec-Butyl alcohol/Ethylbenzene 31.5/3.5 | 29 | good | substantially no change | colorless |
| 9 | 30 | 70 | sec-Butyl alcohol/Ethylbenzene 24.5/10.5 | 120 | good | substantially no change | colorless |
| 10 | 30 | 70 | sec-Butyl alcohol/Ethylbenzene 17.5/17.5 | 180 | good | substantially no change | colorless |
| 11 | 30 | 70 | sec-Butyl alcohol/Methyl isobutyl ketone 31.5/3.5 | 34 | good | substantially no change | colorless |
| 12 | 50 | 50 | sec-Butyl alcohol 35 | 120 | good | substantially no change | slightly yellow |
| 13 | 50 | 50 | sec-Butyl alcohol/Ethylbenzene 31.5/3.5 | 230 | good | substantially no change | slightly yellow |
| Comp. Ex. | | | | | | | |
| 1 | 30 | 70 | Ethylbenzene 35 | 1700 | bad | External temperature of polymerization reactor lowered and productivity lowered after an elapse of 200 hours from initiation of running. | |
| 2 | 30 | 70 | Methyl isobutyl ketone 35 | 2100 | bad | External temperature of polymerization reactor lowered and productivity lowered after an elapse of 200 hours from | slightly yellow |

TABLE 1-continued

| | Composition of solution of starting material (wt. parts) | | | Amount of gel-like polymer attached to a wall of reactor (1) | Appearance of molded article (2) | State of running | Hue of polymer |
|---|---|---|---|---|---|---|---|
| | Acrylo-nitrile | Styrene | Solvent | | | | |
| 3 | 50 | 50 | Ethylbenzene 35 | 3500 | bad | initiation of running. External temperature of polymerization reactor lowered and productivity lowered after an elapse of 150 hours from initiation of running. | yellow |
| 4 | 50 | 50 | Methyl isobutyl ketone 35 | 3700 | bad | External temperature of polymerization reactor lowered and productivity lowered after an elapse of 150 hours from initiation of running. | yellow |

Note:
(1) Amount attached to inner wall of 10 cm × 10 cm (mg/100 cm²)
(2) Plate of 5 cm × 9 cm × 3 mm is prepared by injection molding and the surface thereof was observed with naked eye.

TABLE 2

| | Composition of solution of starting material (wt. parts) | | | | Amount of gel-like polymer attached to a wall of reactor (1) | Appearance of molded article (2) | State of running |
|---|---|---|---|---|---|---|---|
| | Acrylo-nitrile | Styrene | N-phenyl-maleimide | Solvent | | | |
| Example | | | | | | | |
| 14 | 30 | 70 | 0 | sec-Butyl alcohol 40 | 45 | good | substantially no change |
| 15 | 20 | 70 | 10 | sec-Butyl alcohol 40 | 40 | good | substantially no change |

We claim:

1. A process for producing a copolymer by continuously copolymerizing in a solution monomers comprising 40 to 95% by weight of an aromatic vinyl compound and 5 to 60% by weight of a vinyl cyanide compound, and further 0 to 30% by weight of a vinyl compound copolymerizable with the aromatic vinyl compound and vinyl cyanide compound, wherein 10 to 100 parts by weight of a solvent containing not less than 40% by weight of an alcohol is used as the polymerization solvent based on 100 parts by weight of the total amount of the monomers.

2. A process according to claim 1, wherein the alcohol is an aliphatic alcohol having 3 to 6 carbon atoms.

3. A process according to claim 1, wherein the alcohol is secondary butyl alcohol.

4. A process according to claim 1, wherein the polymerization solvent is a solvent containing not less than 90% by weight of secondary butyl alcohol.

5. A process according to claim 1, wherein the polymerization solvent is secondary butyl alcohol.

6. A process according to any one of claims 1 to 5, wherein the copolymerization is carried out under a polymerization temperature of not lower than 90° C. and lower than 200° C. and with the polymerization solution in a homogeneous state.

7. A process according to any one of claims 1 to 5, wherein the polymerization is carried out so that the polymerization conversion is not lower than 30% and the polymerization solution is in a homogeneous state.

8. A process according to claim 6, wherein the polymerization is carried out so that the polymerization conversion is not lower than 30% and the polymerization solution is in a homogeneous state 9. A process according to any one of claims 1 to 5, wherein the polymerization is carried out by continuously feeding a mixture of the polymerization solvent and the monomers into a polymerization zone and continuously removing a solution containing the copolymer from the zone.

10. A process according to claim 6, wherein the polymerization is carried out continuously for not shorter than 200 hours by continuously feeding a mixture of the polymerization solvent and the monomers into a polymerization zone and continuously removing a solution containing the copolymer from the zone.

11. A process according to claim 7, wherein the polymerization is carried out continuously for not shorter than 200 hours by continuously feeding a mixture of the polymerization solvent and the monomers into a polymerization zone and continuously removing a solution containing the copolymer from the zone.

12. A process according to claim 8, wherein the polymerization is carried out continuously for not shorter than 200 hours by continuously feeding a mixture of the polymerization solvent and the monomers into a polymerization zone and continuously removing a solution containing the copolymer from the zone.

13. A process according to any one of claims 1 to 5, wherein the aromatic vinyl compound is styrene and the vinyl cyanide compound is acrylonitrile.

14. In a process of substantially continuously copolymerizing a reaction mixture comprising about 40 to 95% by weight of an aromatic vinyl compound, about 5 to 60% by weight of a vinyl cyanide compound, and about 0 to 301% by weight of a vinyl compound copolymerizable with said aromatic vinyl compound and said vinyl cyanide compound, under copolymerization conditions, for a time not shorter than 200 hours, but long enough to produce a copolymer containing gel, the improvement, whereby allowing said copolymerization to be carried out continuously for such long time without the production of said gel, which comprises carrying out said copolymerization continuously in about 10 to 100 parts by weight, per 100 parts by weight of the total monomers, of a solvent comprising not less than 40% by weight of an alcohol; and recovering a substantially gelfree copolymer product.

15. A process of substantially eliminating the formation of gel specs during the continuous copolymerization of a monomer mixture comprising about 40 to 95% by weight of an aromatic vinyl compound, about 5 to 60% by weight of a vinyl cyanide compound, and about 0 to 30% by weight of at least one comonomer copolymerizable therewith, which comprises carrying out said continuous copolymerization in a solvent comprising not less than about 40% by weight alcohol, and substantially continuously recovering a copolymerization product which is substantially free of gel-specs.

16. The process as claimed in claim 14, wherein said alcohol is sec-butanol.

17. The process as claimed in claim 15, wherein said alcohol is sec-butanol.

* * * * *